United States Patent [19]

Allerton

[11] 4,380,734
[45] Apr. 19, 1983

[54] MEASURING MAGNETIC INTENSITY INDEPENDENT OF SPEED IN A SUCCESSION OF MOVING MAGNETIC STRIPS

[75] Inventor: George L. Allerton, Orefield, Pa.

[73] Assignee: Western Electric Company, Inc., New York, N.Y.

[21] Appl. No.: 164,376

[22] Filed: Jun. 30, 1980

[51] Int. Cl.³ .................... G01R 33/12; G01N 27/72; G06K 9/00
[52] U.S. Cl. ................................... 324/225; 235/449; 324/212; 382/7
[58] Field of Search ........ 324/206, 225, 205, 260–262, 324/210–212; 360/25, 53; 340/825.34, 146.3 C; 235/438, 449; 364/507, 571; 73/159

[56] References Cited

U.S. PATENT DOCUMENTS

| | | |
|---|---|---|
| 2,882,488 | 4/1959 | Price et al. .......................... 324/225 |
| 3,235,776 | 2/1966 | Ireland . |
| 3,389,230 | 6/1968 | Hudson . |
| 3,478,876 | 11/1969 | Littwin et al. . |
| 3,496,457 | 2/1970 | Proctor et al. ................. 324/225 X |
| 3,612,838 | 10/1971 | Conn ............................ 324/225 UX |
| 3,634,657 | 1/1972 | Ballard et al. . |
| 3,676,644 | 7/1972 | Vaccaro et al. . |
| 3,714,558 | 1/1973 | Swanpoel ........................... 324/225 |
| 3,825,728 | 7/1974 | Nakauchi et al. .............. 235/449 X |
| 3,835,374 | 9/1974 | Frost ................................ 324/225 X |
| 3,863,141 | 1/1975 | Mori et al. .......................... 324/225 |
| 3,916,157 | 10/1975 | Roulette et al. . |
| 3,932,731 | 1/1976 | Moore, Jr. . |
| 3,949,193 | 4/1976 | Dowdell . |
| 4,058,763 | 11/1977 | Steingroever . |
| 4,087,789 | 5/1978 | Berry . |
| 4,218,612 | 8/1980 | Krehl et al. ......................... 235/449 |

OTHER PUBLICATIONS

Winegardner, Joe E., "Unit Quantity Dedicated Controllers: Unique Requirements-General Solutions", IECI '76 Conference Proceedings, Mar. 8–10, 1976, pp. 67–69.
Cushman, Robt. H., EDN, Feb. 15, 1969, pp. 73–79, "Transistor Responds To Magnetic Fields".
Murai, Masayuki, "Hall-Effect Magnetic Sensor Reads Data at Any Speed", Electronics, Feb. 1, 1973, pp. 91–96.

Primary Examiner—Gerard R. Strecker
Attorney, Agent, or Firm—G. W. Houseweart; D. C. Watson

[57] ABSTRACT

The magnetic intensity in a succession of strips (12) in an article (10) is measured by producing relative motion between the article (10) and a magnetic sensing head (23) to produce a succession of first voltage waveforms. Each such waveform has a shape substantially characterized by the positions of the poles (13 and 14) in a respective strip (12). Each incremental portion of the shape has an amplitude proportional to the magnetic intensity sensed along the surface of the strip (12) and to the instantaneous speed of the relative motion between the sensing head (23) and such surface. By coupling a generator (31) to the article (10), a second voltage waveform is produced having a shape for each strip, wherein each incremental portion has an amplitude proportional to an instantaneous speed equivalent to the speed producing the first voltage waveform for the respective strip (12). The first waveform of a strip (12) is fed into the numerator input "Z" of a dividing circuit (36) and, simultaneously therewith, the second waveform for the same strip (12) is fed into the denominator input "X1" of the same circuit (36). Advantageously, the circuit (36) has a processing speed sufficient to produce a third voltage waveform of a shape wherein each incremental portion is independent of the speed of the relative motion and is faithful in amplitude and position to the poles (13 and 14) in each respective strip (12).

12 Claims, 6 Drawing Figures

MEASURING MAGNETIC INTENSITY INDEPENDENT OF SPEED IN A SUCCESSION OF MOVING MAGNETIC STRIPS

TECHNICAL FIELD

This invention relates to method and apparatus for measuring magnetic field intensity and, more particularly, to measuring magnetic field intensity in a manner which is independent of the speed at which the field is moved relative to a magnetic reading head.

BACKGROUND OF THE INVENTION

It is well known that the voltage output of conventional magnetic reading heads is dependent upon both the magnetic field intensity incident upon the head and the rate of change of the field intensity per unit time. This of course implies that when attempting to read the magnetic field intensity associated with or emanating from an article or other material, the voltage output from the head is dependent upon the speed of movement of the article or material relative to the head.

Perhaps the most conventional approach to nullifying the effect of the speed dependency is to design precise mechanical systems for moving the article or material at a constant speed relative to the head. This approach of course is ubiquitous in the audio and high fidelity industry. Unfortunately such precise mechanical systems are expensive, highly subject to malfunction and unduly restrictive of the speed at which a measurement of field can be made.

In technical fields such as those relating to computers and credit cards where the magnetic information to be sensed is in the form of relatively regularly spaced patterns of digital signals, there have been numerous relatively complex electronic systems, many involving closely spaced dual magnetic heads, adapted for using the regularity and periodicity of the information as a way of achieving relative independence from the speed problem. However, such techniques are not seen to be adaptable to reading analog or non-digital information.

Another approach to achieving relative independence from the speed problem has been the use of Hall-effect readout heads which are essentially independent of this rate of change of the magnetic field incident thereupon. See, for example, "Hall-Effect Magnetic Sensor Reads Data at any Speed", Electronics, Feb. 1, 1973. However, Hall-effect magnetic sensors are relatively expensive, not readily adaptable to measuring areas less than about 0.010 inches by 0.020 inches, and typically suffer from temperature instability problems. Consequently, some of the advantages provided by the use of Hall-effect readout heads are essentially nullified in that relatively complex and expensive temperature stabilizing and/or compensating networks typically must be used in connection therewith.

Still another approach to achieving relative freedom from the speed dependency problem was the invention of the semiconductive magnetic transducer, as described in U.S. Pat. No. 3,389,230, and as further described in EDN, Feb. 15, 1969, at pages 73–78. This semiconductive magnetic transducer, commonly called the magnistor, is essentially a dual collector bipolar transistor which relies on diversion of current from one collector to the other in the presence of a magnetic field as an indication of the intensity of the magnetic field. The magnistor is relatively free from the speed dependency problem; however its relative fragility and unreliable availability after more than ten years since its announcement to the public have not satiated the long felt need for a simple and economical magnetic reading apparatus and method which is independent of the speed of movement of an article or material relative thereto.

SUMMARY OF THE INVENTION

In view of the foregoing and other problems associated with prior magnetic reading apparatus and methods, it is an object of this invention to provide an apparatus and method for measuring magnetic field intensity in a manner which is independent of the speed at which an article or material whose magnetic field intensity is to be measured is moved relative thereto.

To this and other ends a method of measuring magnetic field intensity in accordance with this invention includes the step of producing relative motion between an article and a magnetic reading head of the type which produces a first voltage waveform proportional both to magnetic field intensity and to the speed of the relative motion. As the article or material is moved, there is generated a second voltage waveform proportional to the speed of the relative motion. The first voltage waveform is divided by the second voltage waveform to produce a third voltage waveform which is independent of the speed of the relative motion and therefore proportional only to the magnetic field intensity.

In an illustrative embodiment, the reading head is recessed into a flat surface and a wheel with a frictional rim and having its axis essentially parallel to the flat surface also is recessed into the flat surface so as to slightly protrude therefrom. As an article whose magnetic field intensity is to be measured is moved along the flat surface in proximity with the head, the article frictionally engages and turns the wheel. The wheel is coupled to a generator adapted to produce a voltage proportional to the speed of turning of the wheel and therefore to the speed of movement of the article. The signals from the reading head and from the generator are coupled to a divide circuit, the output of which produces a voltage which is independent of the speed and proportional to the magnetic field intensity.

In another somewhat modified illustrative embodiment a wheel having a toothed perimeter is coupled to a generator and a toothed member engaging the wheel is adapted to follow movement of the article in proximity with the head and thereby to turn the wheel at a speed proportional to the speed of movement of the article.

Also in accordance with this invention are apparatus including expedients for performing the steps of the above described methods.

BRIEF DESCRIPTION OF THE DRAWINGS

The aforementioned and other features, characteristics, advantages, and the invention in general, will be better understood from the following more detailed description taken in conjunction with the accompanying drawing in which.

Figure 1:
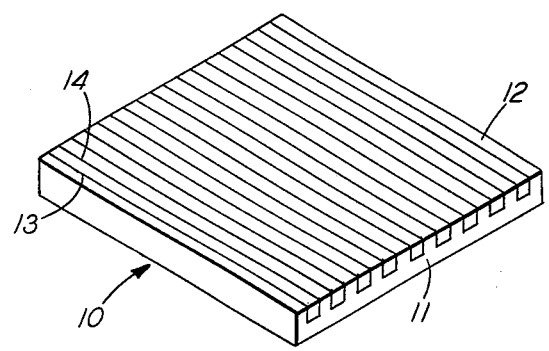
FIG. 1 is a somewhat pictorial perspective view of an illustrative article whose magnetic field intensity is to be measured.

It will be appreciated that for simplicity and clarity of explanation the figures are not necessarily drawn to scale and that reference numerals have been repeated as considered appropriate in the figures to indicate corresponding features.

DETAILED DESCRIPTION

With reference now to the drawing, FIG. 1 shows a somewhat pictorial perspective view of an illustrative article whose magnetic field is to be measured using the apparatus and methods in accordance with this invention. The article 10 is a magnetic chip carrier used in the semiconductor industry for transporting semiconductor chips having a magnetic coating thereon from one location to another. Carrier 10 may for example be an essentially square slab of magnetic material such as strontium ferrite about 2.5 inches on a side and about 0.25 inches in thickness, although these dimensions are of course not critical or even important to the description of this invention.

One flat surface of carrier 10 is magnetized into magnetic strips 12 of alternating north and south lines of magnetic poles 13 and 14. As described in Western Electric's *technical digest*, No. 46, April 1977, at page 13, magnetic strips 12 typically are produced by overlaying the carrier 10 with a serpentine pattern of wire having a pitch of about 40 loops per inch and then passing a d.c. current through the wire for a short period of time, for example several seconds.

For a variety of reasons including irregularities in the ferrite, non-uniformities in the gauge of the wire and of the placement of the wire upon the substrate 11, irregularities in the magnetization produced in the substrate 11 can occur; and it is often desired to measure the resultant magnetic intensity of each of the strips after magnetization. Further, during use in the semiconductor industry, the magnetization in the carrier 10 can become changed due to a variety of reasons including jarring which can affect the alignment of the magnetic dipoles in the ferrite, as well as inadvertent interference from environmental magnetic fields.

Figure 2:
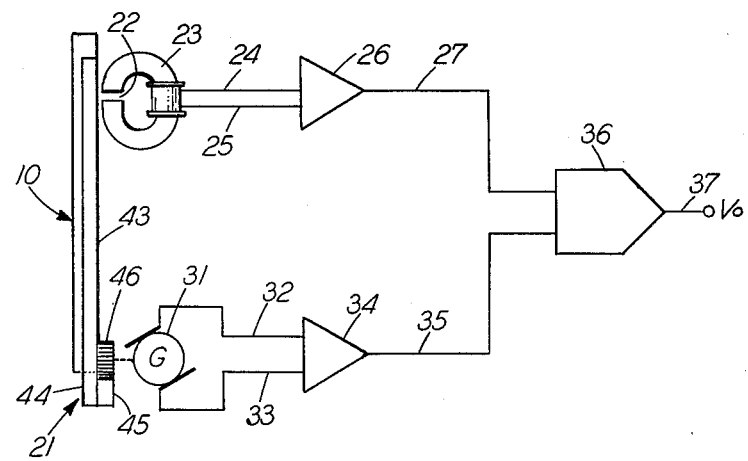
FIG. 2 is a simplified schematic block diagram of apparatus in accordance with this invention for producing a voltage output which is independent of the speed of movement of a magnetic field past a read head.

For a more detailed description now of the methods and apparatus for measuring the magnetic field intensity associated with an article such as a carrier 10 or any other article or material, reference is now made to the block diagram of FIG. 2. In FIG. 2 there is shown the carrier 10 in association with a slideable holder 21 which will be described in more detail with reference to FIGS. 3–5. As shown, carrier 10 is disposed in proximity with the reading gap 22 of a generalized conventional magnetic reading head 23, which is coupled electrically via lines 24 and 25 to an amplifier 26, which, as described in more detail with reference to FIG. 6, typically will be an operational amplifier. The output voltage of head 23 and hence of amplifier 26 on line 27 will be proportional to both the intensity of the magnetic field associated with carrier 10 and the speed at which carrier 10 is moved past the gap 22 in the head.

To remove the dependency of the measurement on the speed of the movement of the carrier, a generator 31 is coupled to the carrier 10 or holder 21 (by means not shown in FIG. 2, but shown in FIGS. 3–5) to produce across lines 32 and 33 a voltage which is proportional to the speed of movement of the carrier or holder. The voltage across lines 32 and 33 is coupled to an amplifier 34, also typically an operational amplifier, to produce an output voltage on line 35 which is proportional to the speed of movement of the holder 21 and carrier 10.

As can be seen, lines 27 and 35 are coupled to respective inputs of a divider circuit 36, described in more detail with reference to FIG. 6, which produces at its output 37 a voltage $V_0$ which is independent of the speed at which the holder 21 and carrier 10 are moved relative to read head 23.

Figure 3:
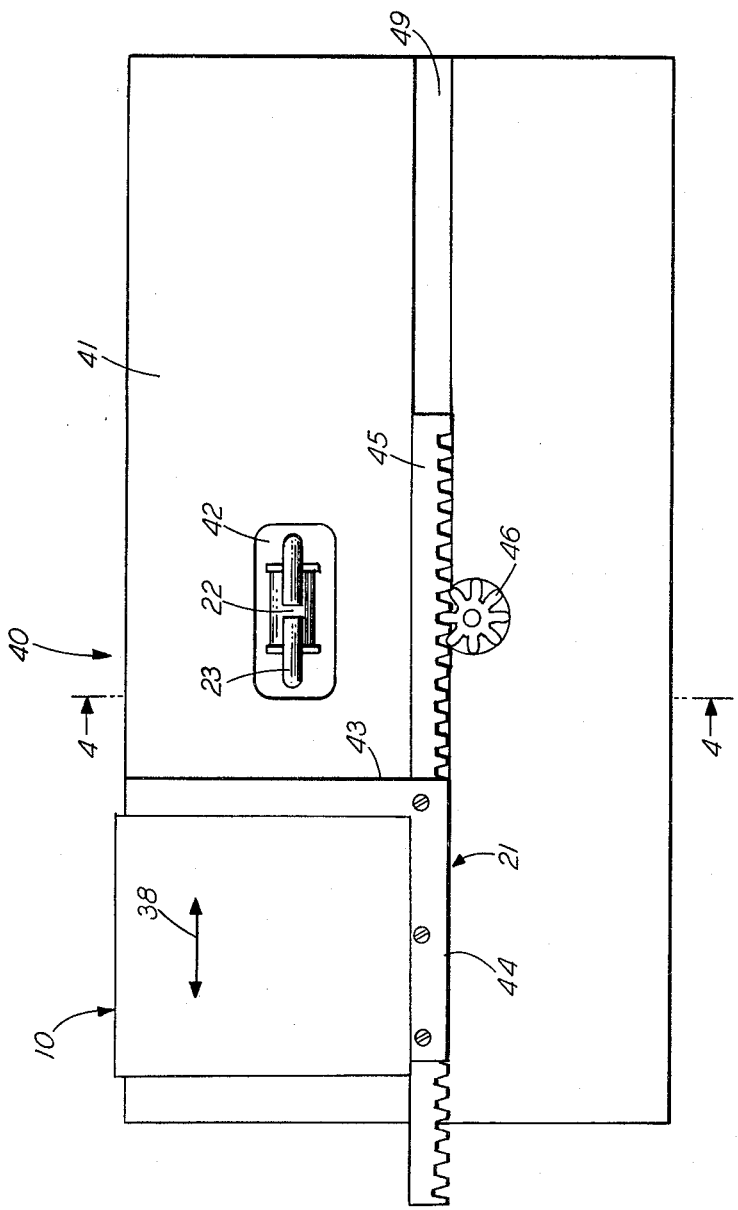
FIG. 3 is a plan view of an illustrative apparatus in accordance with this invention.
Figure 4:
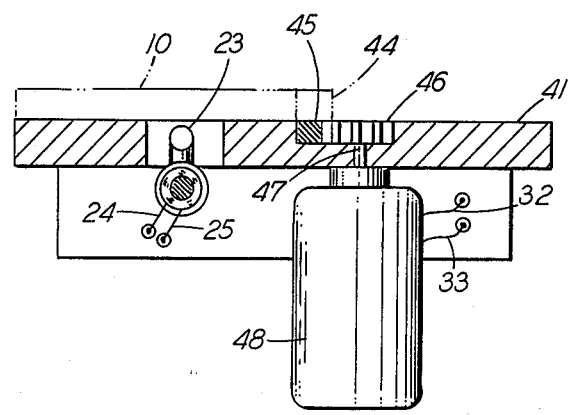
FIG. 4 is a somewhat simplified cross-sectional view of the apparatus of FIG. 3.

With reference now to FIG. 3, there is shown a plan view of apparatus designated generally by the numeral 40 for performing the method described generally with respect to FIG. 2. FIG. 4 is a somewhat simplified cross-sectional view taken along lines 4—4 in FIG. 3.

Apparatus 40 includes a relatively flat surface 41 having a void 42 therein. A conventional magnetic reading head 23, such as depicted more schematically in FIG. 2, is mounted into void 42 so as to be recessed slightly, typically 3–4 mils (0.003–0.004 inches), below the surface 41. It will be appreciated that void 42 need not extend completely through the material forming surface 41 but may as well be a suitably deep depression therein.

A slideable holder 21 including right-angled members 43 and 44 attached to a toothed sliding member 45 is adapted for sliding along a channel 49 recessed into the surface 41. As can be seen, the teeth of member 45 engage correspondingly pitched teeth in a wheel 46 to cause rotation of the wheel at a speed proportional to the speed of the sliding holder 21 and toothed member 45 along the channel 49.

As is more readily seen in FIG. 4, the toothed wheel 46 is coupled via an armature 47 to a generator 48, analogous to generator 31 in FIG. 2, which produces across wires 32 and 33 a voltage proportional to the rotational speed of wheel 46. Also depicted in FIG. 4 are wires 24 and 25 leading from tape head 23.

In operation, an article such as a carrier 10 is placed on surface 41 with the magnetized side facing surface 41 and in contact with the holder 21 formed by members 43 and 44. As indicated by an arrow 38, the article is translated along surface 41, for example by pushing or pulling the article in contact with the holder 21 over and in proximity with reading head 23. As such translation occurs, the teeth of member 45 engage wheel 46, causing it to turn and thus causing generator 48 to produce across lines 32 and 33 a voltage proportional to the rate at which the article is translated in relation to reading head 23.

Figure 5:
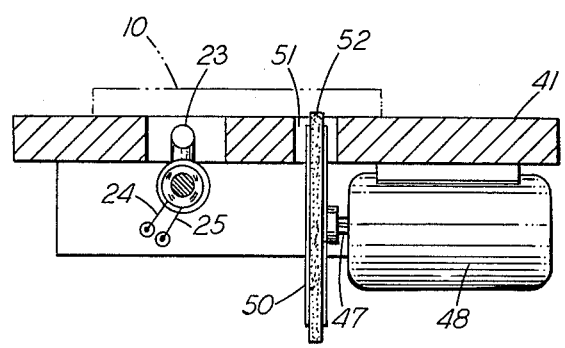
FIG. 5 is a somewhat simplified cross-sectional view showing a modified form of the apparatus illustrated in FIGS. 3 and 4.

With reference now to FIG. 5, there is shown a somewhat simplified cross-sectional view of a modification to the apparatus of FIGS. 3 and 4. As can be seen, the modification is that instead of using a toothed sliding member 45 and wheel 46, the generator 48 has been realigned to have its axis essentially parallel to the surface 41 and a non-toothed wheel 50 has been substituted for wheel 46.

A portion of wheel 50 extends through a slot 51 in surface 41 so as to protrude slightly thereabove. A frictional outer perimeter 52, such as for example rubber, frictionally engages an article such as carrier 10 as it is translated in proximity with reading head 23. Of course the distance between reading head 23 and the slightly protruding perimeter 52 of wheel 50 is adapted to accommodate the size of the article being translated in relation thereto so as to enable engagement of the article with the perimeter 52 while the article is being translated in proximity with the reading head 23.

It will be apparent that the materials used in the apparatus of FIGS. 3-5 advantageously are selected to be non-magnetic, such as brass or plastic, to avoid interference with the magnetic fields to be measured and to avoid magnetization of themselves. Also, for the material forming surface 41, it is advantageous to select one of sufficient hardness, e.g., beryllium-copper, such that repeated transfer of articles thereover does not cause significant erosion of the material.

Of course, not all of the materials in the entire apparatus need be non-magnetic. For example, an embodiment which has been used, where the spacing from the center line of wheel 46 to the center of reading head 23 is about $2\frac{1}{2}$ inches, wheel 46 was of a magnetic material such as iron and no interference was detected.

Figure 6:
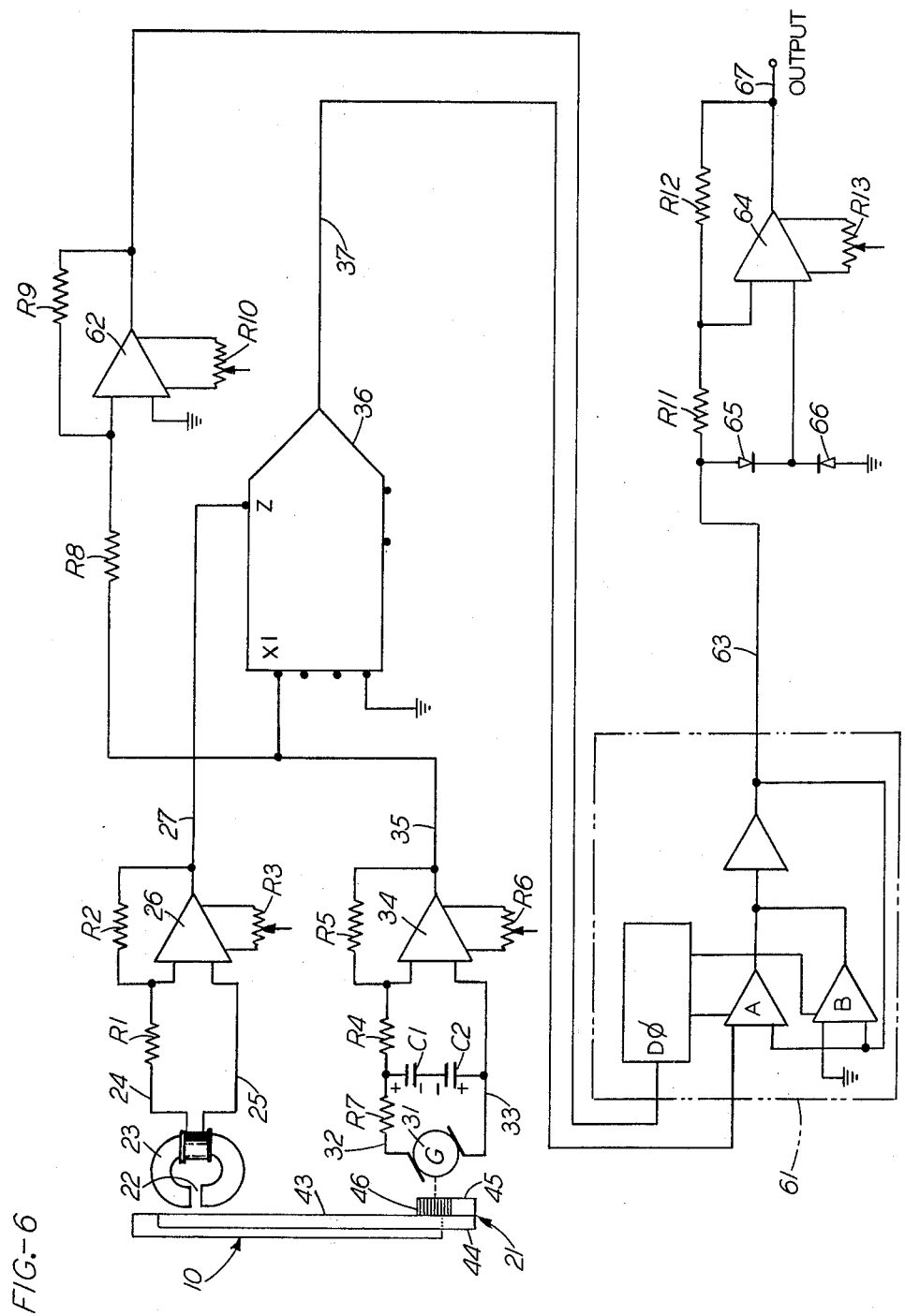
FIG. 6 is a more detailed circuit schematic diagram illustrating a more specific embodiment of the features shown in FIG. 2 and further illustrating other features which are often useful in combination with the invention for providing certain types of output signals.

With reference now to FIG. 6, there is shown in more detail a schematic diagram of a circuit suitable for use in accordance with this invention, as well as ancillary circuitry for providing a particular form of output voltage. As can be seen in FIG. 6, an article whose magnetic intensity is to be measured, such as a carrier 10 previously referred to, is moved in proximity with a magnetic head 23. The movement is coupled as described with reference to FIGS. 3-5 to a generator 31.

Lines 24 and 25, as in FIG. 2, are coupled to an operational amplifier 26 which is controlled by resistors R1 and R2 to have a particular gain and by a variable resistor R3 to adjust the zero-offset. In an embodiment which has operated successfully, the tape head was a Nortronics Model No. W2P8N-A cassette tape head and resistors R1 and R2 were 1K and 48K ohms respectively to provide a gain of 48 across amplifier 26, and resistor R3 was 5K ohms.

Also as in FIG. 2, lines 32 and 33 from generator 31 are coupled to an operational amplifier 34 which is controlled by resistors R4 and R5 to have an appropriate, empirically determinable gain and by a variable resistor R6 to adjust the zero-offset. In an embodiment where generator 31 was a Mabuchi motor, Model No. TM21K751, available from Herbach and Rademan, Philiadelphia, Pa., resistors R4 and R5 were 1K and 18K ohms respectively to provide a gain of 18, and resistor R6 was 5K ohms.

Generator 31 is resistively coupled by a resistor R7 to the resistor R4 of amplifier 34. Additionally, smoothing capacitors C1 and C2, for example about 20 microfarads each, are coupled back-to-back across lines 32 and 33 to reduce the ripple of the voltage from generator 31.

In an embodiment which was constructed and operated successfully, amplifiers 26 and 34 were Western Electric Model No. 502AR amplifiers. However those in the art will appreciate that any of a great variety of commercially available operational amplifiers, such as the Burr-Brown Model No. 3003, may be used instead.

As in FIG. 2, lines 27 and 35 from amplifiers 26 and 34 respectively are coupled to separate inputs of a divider circuit 36. In our embodiment, circuit 36 was an Intronics Series M54OH Multiplier/Divider available from Intronics, 57 Chapel Street, Newton, Mass. Using the M54OH, line 27 is coupled to input Z and line 35 is coupled to input X1, which causes circuit 36 to divide the instantaneous value on line 27 by the instantaneous value on line 35 and to provide the result on an output line 37. Following the manufacturer's instructions, several external calibrating components (not shown) were used in conjunction with the M54OH to control its performance and to calibrate it at both ends of the expected operating range. For simplicity and clarity, these are not shown, as their selection and implementation following the manufacturer's instructions are well within the skill of those in the art.

At this point it will be appreciated that there is available on the output line 37 a voltage which is independent of the speed of the article under test and is dependent only upon the magnitude of the field incident upon gap 22 of tape head 23. The magnitude of the output on line 37 of course, while being proportional only to the magnetic field, is in itself of absolute magnitude determined by the gain of amplifiers 26 and 34 as well as the operating voltage of circuit 36.

As will be appreciated, the stability of any circuit wherein a possibility of dividing by zero is involved would be in jeopardy. For this reason, since the signal on line 35 from generator 31 will be at or near zero voltage when no movement is detected by generator 31 and since the signal on line 27 is to be divided by the signal on line 35, it is considered desirable to decouple circuit 36 during any time when the signal on line 35 is at or near zero voltage. This decoupling is a principal function of a circuit module 61 in our embodiment. Circuit module 61 was a four-channel programmable amplifier, Model HA-2405, available from Harris Semiconductor, Melbourne, Fla.

As seen the voltage on line 35 is coupled through an isolating operational amplifier 62 to a D∅ input in module 61. Amplifier 62 is controlled by resistors R8 and R9, e.g., 4.7K ohms each, to have unity gain and a zero-offset adjusting resistor R10, e.g., 5K ohms, also is shown.

Module 61 includes operational amplifiers A and B, the outputs of which, on a line 63, are controllable by the input D∅. To cause operation of the HA-2405 in this manner, several external components (not shown) for enabling and calibrating must be selected and implemented in accordance with the manufacturer's instructions. Such is well within the skill of those in the art and, for simplicity and clarity, these have been omitted from the drawing.

Module 61 is adapted to provide to output line 63 a voltage equal to zero whenever the voltage on line 35 is zero or less than a predetermined small amount, e.g., one volt, and to provide to line 63 the voltage on line 37 at all other times. This, of course, has the effect of decoupling the output 37 of the divider circuit 36 from the output 67 whenever divide circuit 36 is close to a divide-by-zero condition caused by the low or zero voltage at input X1.

Finally, the voltage on line 63 is coupled through a full wave rectifier including diodes 65 and 66 coupled between lines 63 and ground and an operational amplifier 64 controlled by equal valued resistors R11 and R12 and a zero-adjusting resistor R13 to have unity gain. With this combination of diodes and amplifier, the effect of the forward voltage drop of diode 65 is eliminated, thus allowing the rectifier to remain linear at low voltage, e.g., below about 0.5 volts.

Thus there is available on the output line 67 a full wave rectified output voltage which is proportional to the intensity of the magnetic field incident upon the magnetic reading head and independent of the speed of movement of an article past the head.

In operation for measuring the intensity of the successive magnetic stripes on a carrier 10 of the type illustrated in FIG. 1, the carrier is placed face down upon the surface 41 of the apparatus of FIGS. 3–5 and moved over magnetic reading head 23 so that the successive north-south poles recur periodically over the head. With such apparatus of the type described above using the Nortronics tape head recessed by about 3–4 mils into the surface 41 of the apparatus, a sensitivity to magnetic fields of between about 20 and 220 Oersteds has been observed. Nominal values of magnetism in a carrier 10 are typically in the 100–150 Oersted range. The optimum rate of movement of the holder past the magnetic head was observed to be of the order of about 100 lines per second or about 2.5 inches per second and a maximum testing rate of about 2,000 lines per second was observed. At such a rate of movement, the voltage from the Mabuchi motor operated as a generator was in the range of 0.1 to 1.0 volt.

With the carrier 10 so moved past head 23 the output on line 67 in FIG. 6 is essentially a full wave rectified sinusoid having periodicity determined by the exact rate of movement but having magnitude independent of such rate. Of course, such output could be displayed on an oscilloscope or other display device (not shown) if desired.

As will be appreciated, the output on line 67 could also be coupled to a microprocessor for various data interpretations, as described in the paper by J. E. Winegardner entitled "Unit Quantity Dedicated Controllers: Unique Requirements—General Solutions", presented at the IEEE Industrial Electronics Control and Instrumentation Conference, held in Philadelphia on Mar. 8–10, 1976. Such data collection and manipulation might for example include averaging the values of the peak intensities observed from each of the magnetic poles and measuring relative intensities of adjacent peaks to determine complete suitability for functioning as a chip carrier.

Although the invention has been described in part by making detailed reference to specific embodiments, such detail is intended to be and will be understood to be instructive rather than restrictive. It will be appreciated by those in the art that many variations may be made in the structure and mode of operation without departing from the spirit and scope of the invention as disclosed in the teachings contained herein.

For example, instead of a frictional rim for wheel 50 in FIG. 5 a magnetic rim could be employed so that the wheel would be turned by the magnetic attraction between the article 10 and the rim.

Further, instead of employing a generator to produce the voltage proportional to the speed, the moving article could be coupled to a variable impedance such as a sliding variable resistor or potentiometer adapted in a circuit to produce a voltage whose instantaneous magnitude would be proportional to the position of the article. This position-dependent voltage could then be differentiated by a standard differentiation circuit to provide a voltage dependent on the rate of change of the position-dependent voltage. This, of course, is the speed-dependent voltage sought.

Throughout this specification and claims the term "article" to be measured will be understood to include any object or material such as for example and without limitation a magnetic tape.

What is claimed is:

1. A method of measuring magnetic intensity in each of a succession of magnetic strips in an article, comprising:
    producing relative motion between the article and a magnetic sensing head to produce a succession of first voltage waveforms, each having a shape substantially characterized by the positions of the poles in a respective strip and wherein each incremental portion of the shape has an amplitude proportional to the magnetic intensity sensed along the surface of the strip and to the instantaneous speed of the relative motion between the sensing head and such surface;
    producing a second voltage waveform having a shape for each strip wherein each incremental portion has an amplitude proportional to an instantaneous speed equivalent to the speed producing the first voltage waveform for the respective strip; and
    simultaneously feeding the first waveform for each strip into the numerator input and the second waveform into the denominator input of a dividing circuit having a processing speed sufficient to produce a third voltage waveform of a shape wherein each incremental portion is independent of the speed of the relative motion and is faithful in amplitude and position to the poles in the strip.

2. A method as in claim 1 wherein the density of strips in an article is such that the lines of poles occur about 40 times or more per inch along the surface of the article, and wherein the speed of the relative motion causes the lines to appear at the sensing head at a rate of from about 100 to about 2,000 times per second, further comprising as part of the feeding and dividing step:
    processing the instantaneous signals through the divider circuit at a frequency of at least one megahertz to faithfully represent in the third waveform the amplitude and position of the poles in the strip.

3. A method as recited in claim 2 wherein the article has a flat surface and the magnetic sensing head is recessed into a second flat surface and wherein the relative motion is produced by sliding the flat surface of the article along the second flat surface and over the head.

4. A method as recited in claim 3 wherein the second voltage waveform is produced by coupling the article to a generator to turn the armature of the generator at a speed proportional to the speed of the article, including:
    moving a toothed member along with the article and engaging the toothed member with a toothed wheel attached to the armature.

5. A method as recited in claim 4 further comprising:
    coupling the third voltage waveform to a full wave rectifier to produce a fourth voltage waveform of a single polarity; and
    coupling the fourth voltage waveform to a display device to display an indication of the measured field intensity.

6. A method as recited in claim 5 further comprising the step of:
    decoupling the third voltage waveform from the full wave rectifier when the second voltage waveform is substantially zero.

7. Apparatus for measuring magnetic intensity in each of a succession of magnetic strips in an article, comprising:

means for producing relative motion between the article and a magnetic sensing head to produce a succession of first voltage waveforms, each having a shape substantially characterized by the pole positions in a respective strip and wherein each incremental portion of the shape has an amplitude proportional to the magnetic intensity sensed along the surface of the strip and to the instantaneous speed of the relative motion between the sensing means and such surface;

means for producing a second voltage waveform having a shape for each strip wherein each incremental portion has an amplitude proportional to an instantaneous speed equivalent to the speed producing the first voltage waveform for the respective strip; and means for simultaneously feeding the first waveform for each strip into the numerator input and the second waveform into the denominator input of a dividing circuit having a processing speed sufficient to produce a third voltage waveform of a shape wherein each incremental portion is independent of the speed of the relative motion and is faithful in amplitude and position to the poles in the strip.

8. Apparatus as in claim 7 wherein the density of strips in an article is such that the lines of poles occur about 40 times or more per inch along the surface of the article, and wherein the speed of the relative motion causes the lines to appear at the sensing heat at a rate of from about 100 to about 2,000 times per second, further comprising:

means for processing the instantaneous signals through the divider circuit at a frequency of at least one megahertz to faithfully represent in the third waveform the amplitude and position of the poles in the strip.

9. Apparatus as in claim 8 wherein the article has a flat surface, further comprising:

a second flat surface wherein the magnetic sensing head is recessed; and means for sliding the flat surface of the article along the second flat surface and over the head to produce the relative motion.

10. Apparatus as in claim 9 further comprising:

a generator for producing the second voltage waveform, said generator having an armature adapted to be driven by a toothed wheel; and a toothed member adapted to move with the article and engaged to the toothed wheel of the armature to turn the same at a speed proportional to the speed of the article.

11. Apparatus as recited in claim 10 further comprising:

a full wave rectifier means for operating on the third voltage waveform to produce a fourth voltage waveform of a single polarity; and a display device and means for coupling the fourth voltage waveform thereto to provide a visual indication of the measured magnetic intensity and positions of the poles in respective strips in the article.

12. Apparatus as recited in claim 11 further comprising:

means for decoupling the third voltage waveform from the full wave rectifier means when the second voltage waveform is substantially zero.

* * * * *

UNITED STATES PATENT AND TRADEMARK OFFICE
CERTIFICATE OF CORRECTION

PATENT NO. : 4,380,734
DATED : April 19, 1983
INVENTOR(S) : G. L. Allerton

It is certified that error appears in the above—identified patent and that said Letters Patent is hereby corrected as shown below:

Column 9, line 33, "heat" should be --head--.

Signed and Sealed this

Twelfth Day of July 1983

[SEAL]

Attest:

GERALD J. MOSSINGHOFF

*Attesting Officer*   *Commissioner of Patents and Trademarks*